(12) United States Patent
Mani et al.

(10) Patent No.: US 12,692,079 B2
(45) Date of Patent: Jul. 28, 2026

(54) DYNAMIC LOAD SAFETY DEVICE

(71) Applicant: Applied Materials, Inc., Santa Clara, CA (US)

(72) Inventors: Ganapathi Mani, Dharmapuri (IN); Subhaschandra Shreepad Salkod, Bangalore (IN); Suresh Kumar Krishna Murthy Upadya, Bangalore (IN); Somnath Kalgal, Bengaluru (IN)

(73) Assignee: Applied Materials, Inc., Santa Clara, CA (US)

( * ) Notice: Subject to any disclaimer, the term of this patent is extended or adjusted under 35 U.S.C. 154(b) by 96 days.

(21) Appl. No.: 18/409,553

(22) Filed: Jan. 10, 2024

(65) Prior Publication Data

US 2025/0223107 A1     Jul. 10, 2025

(51) Int. Cl.
B65G 13/06 (2006.01)

(52) U.S. Cl.
CPC ........ B65G 13/06 (2013.01); *B65G 2203/042* (2013.01)

(58) Field of Classification Search
CPC .......................... B65G 13/06; B65G 2203/042
USPC ....................................................... 198/782
See application file for complete search history.

(56) References Cited

U.S. PATENT DOCUMENTS 3,561,280 A * 2/1971 MacPhee et al. ........ G01D 5/16
74/519

FOREIGN PATENT DOCUMENTS

| | | | | |
|---|---|---|---|---|
| CN | 116519298 A | * | 8/2023 | ............ G01M 13/04 |
| DE | 10200505595 | * | 6/2007 | |
| DE | 102005055995 A1 | * | 6/2007 | |
| EP | 0053429 | * | 6/1982 | |
| JP | H0829347 | * | 2/1996 | |
| KR | 2355265 | * | 2/2022 | |
| KR | 2355265 B1 | * | 2/2022 | |

OTHER PUBLICATIONS

Description DE102005055995A1 (Year 1997) (Year: 1997).*

* cited by examiner

*Primary Examiner* — Gene O Crawford
*Assistant Examiner* — Lester Rushin, III
(74) *Attorney, Agent, or Firm* — Kilpatrick Townsend & Stockton LLP

(57) ABSTRACT

Exemplary dynamic load safety devices may include a shaft. The safety devices may include a first roller bearing mounted on the shaft. The safety devices may include a second roller bearing mounted on the shaft. The first roller bearing and the second roller bearing may be spaced apart along a length of the shaft. The safety devices may include a roller mounted on the first roller bearing and the second roller bearing The safety devices may include at least one strain gauge disposed on the shaft between the first roller bearing and the second roller bearing.

20 Claims, 4 Drawing Sheets

300

305
MOVE A MATERIAL AGAINST A ROLLER MOUNTED
ON A SHAFT

310
MEASURE STRAIN OF THE SHAFT

315
DETERMINE THAT THE STRAIN EXCEEDS A
PREDETERMINED THRESHOLD

320
TRIGGER A SAFETY ACTION BASED ON THE STRAIN
EXCEEDING THE PREDETERMINED THRESHOLD

DYNAMIC LOAD SAFETY DEVICE

TECHNICAL FIELD

The present technology relates to processes and equipment that produce materials and/or have components that experience dynamic loads during operation of the equipment. More specifically, the present technology relates to dynamic load safety devices.

BACKGROUND OF THE INVENTION

Rotary devices used to feed material (whether a production material or a moving component of a piece of equipment) often experience varying force loads during operation of the equipment. These varying force loads may cause problems with the effectiveness and/or safety associated with a given process or operation of the equipment. For example, if loads increase to certain levels, the material being fed may become damaged, which may result in manufacturing downtime and/or waste associated with unusable product. The high loads may also result in unnecessary stress being placed upon components of the equipment, which may cause increased wear and/or other damage. Damage to the equipment and/or material may also cause safety issues, such as those associated with forces generated by the snapping of materials that were under high levels of tension.

Thus, there is a need for improved systems and methods that can be used to increase the safety and maintain operation of equipment and processes that place materials under dynamic loads. These and other needs are addressed by the present technology.

BRIEF SUMMARY OF THE INVENTION

Exemplary dynamic load safety devices may include a shaft. The safety devices may include a first roller bearing mounted on the shaft. The safety devices may include a second roller bearing mounted on the shaft. The first roller bearing and the second roller bearing may be spaced apart along a length of the shaft. The safety devices may include a roller mounted on the first roller bearing and the second roller bearing. The safety devices may include at least one strain gauge disposed on the shaft between the first roller bearing and the second roller bearing.

In some embodiments, the at least one strain gauge may include a plurality of strain gauges. Each of the plurality of strain gauges may be centered with respect to the roller and disposed on a different surface of the shaft. The shaft may include a plurality of flat surfaces. Each of the plurality of strain gauges may be coupled with a respective one of the plurality of flat surfaces. The shaft may include a first cutout that extends radially inward from a peripheral surface of the shaft at a first location along the length of the shaft. The shaft may include a second cutout that extends radially inward from the peripheral surface of the shaft at a second location along the length of the shaft. The first cutout and the second cutout may be on opposing sides of the at least one strain gauge. The first cutout and the second cutout may extend through at least half of a thickness of the shaft. The first cutout and the second cutout may extend radially inward from the peripheral surface in opposite directions. At least a portion of a peripheral surface of the roller may be concave. The safety devices may include at least one electric line coupled with the at least one strain gauge. The at least one electric line may extend through a channel formed within the shaft. The channel may extend along at least a portion of the length of the shaft.

Some embodiments of the present technology may encompass dynamic load safety devices that may include a shaft. The safety devices may include one or more bearings mounted on the shaft. The safety devices may include a roller mounted on the one or more bearings. The safety devices may include at least one strain gauge disposed on the shaft.

In some embodiments, the safety devices may include a controller that is electrically coupled with the at least one strain gauge. The safety devices may include a signal conditioner electrically coupled between the at least one strain gauge and the controller. The shaft may include a first cutout that extends radially inward from a peripheral surface of the shaft at a first location along a length of the shaft. The shaft may include a second cutout that extends radially inward from the peripheral surface of the shaft at a second location along the length of the shaft. Each of the first cutout and the second cutout may be generally semicircular in shape. A peripheral surface of the roller may include a concave region. The concave region may be centered with respect to the at least one strain gauge.

Some embodiments of the present technology may encompass methods of monitoring a dynamic load. The methods may include moving a material against a peripheral surface of a roller of a dynamic load safety device. The roller may be mounted on a shaft using at least one roller bearing. The methods may include measuring a strain of the shaft as the roller rotates about the shaft. The methods may include determining that the strain exceeds a predetermined threshold. The methods may include triggering a safety action based on determining that the strain exceeds the predetermined threshold.

In some embodiments, the safety action may include at least one of slowing down the material, stopping the material, triggering an audible alarm, or triggering a visual alarm. The shaft may remain stationary relative to the material while roller rotates about the shaft.

Such technology may provide numerous benefits over conventional systems and techniques. For example, the dynamic load safety devices may continuously monitor the loads on moving materials and/or equipment, which may enable safety precautions to be automatically triggered before material and/or equipment is damaged. This may not only help limit service downtime and product damage but may also help prevent safety issues from arising due to damaged equipment and/or tensioned materials. Thus, embodiments may improve the safety and effectiveness of numerous processing operations that include moving materials/components that experience dynamic loading. These and other embodiments, along with many of their advantages and features, are described in more detail in conjunction with the below description and attached figures.

BRIEF DESCRIPTION OF THE DRAWINGS

A further understanding of the nature and advantages of the disclosed technology may be realized by reference to the remaining portions of the specification and the drawings.

Figure 1A:
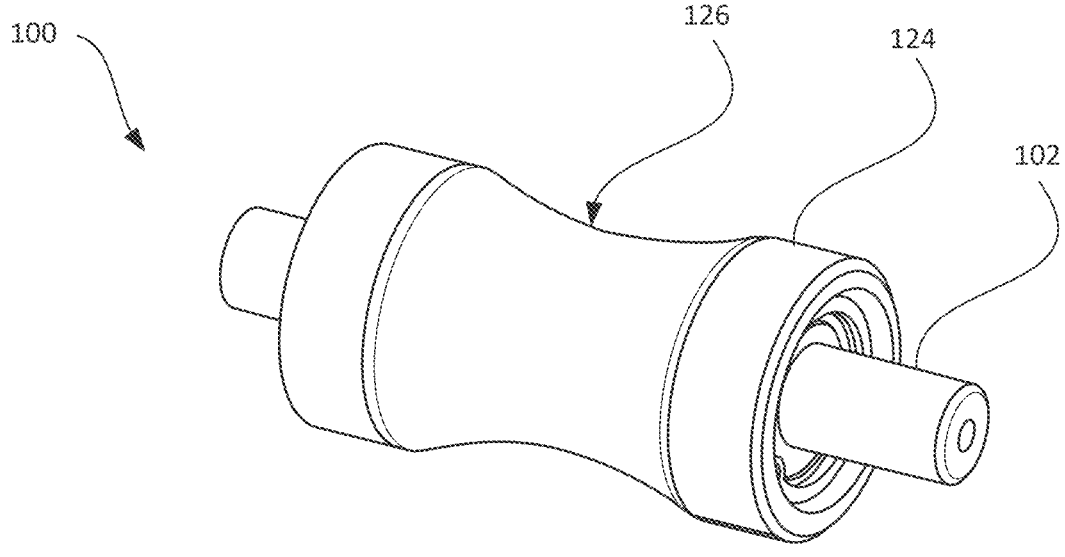
FIG. 1A illustrates an isometric view of a dynamic load safety device according to embodiments of the present invention.
Figure 1B:
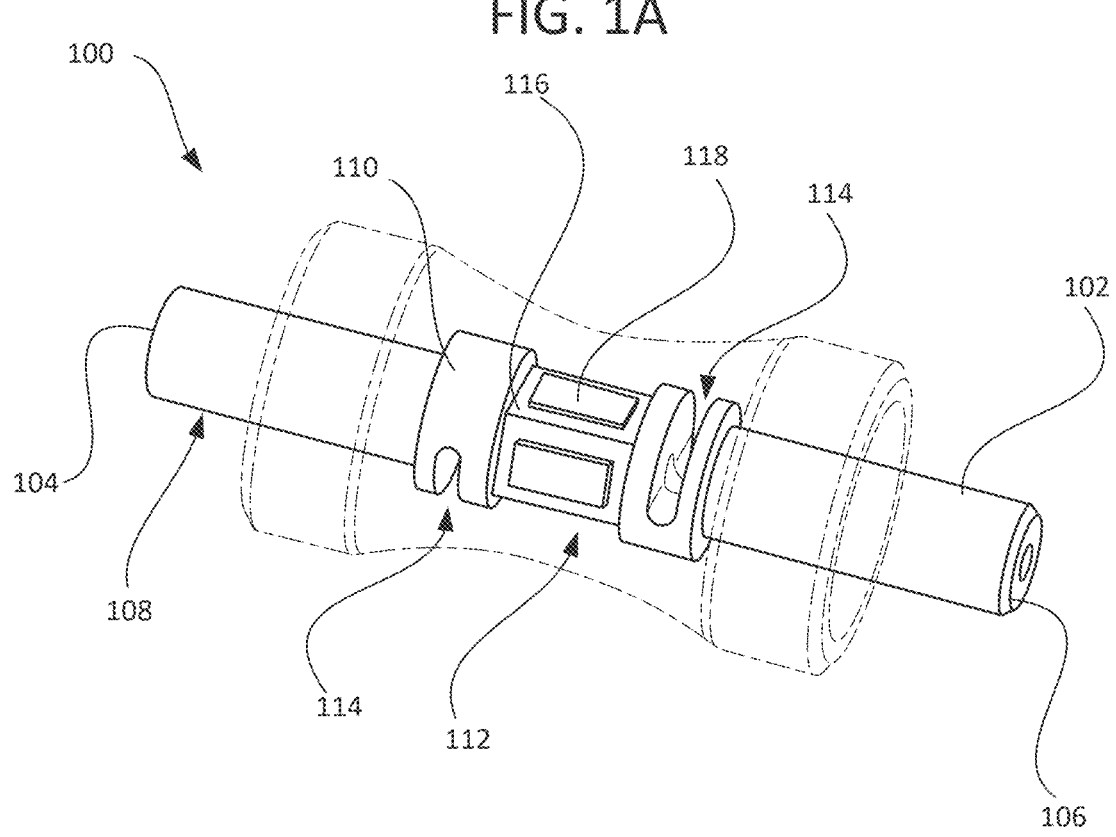
FIG. 1B illustrates a partial isometric view of the dynamic load safety device of FIG. 1A.
Figure 1C:
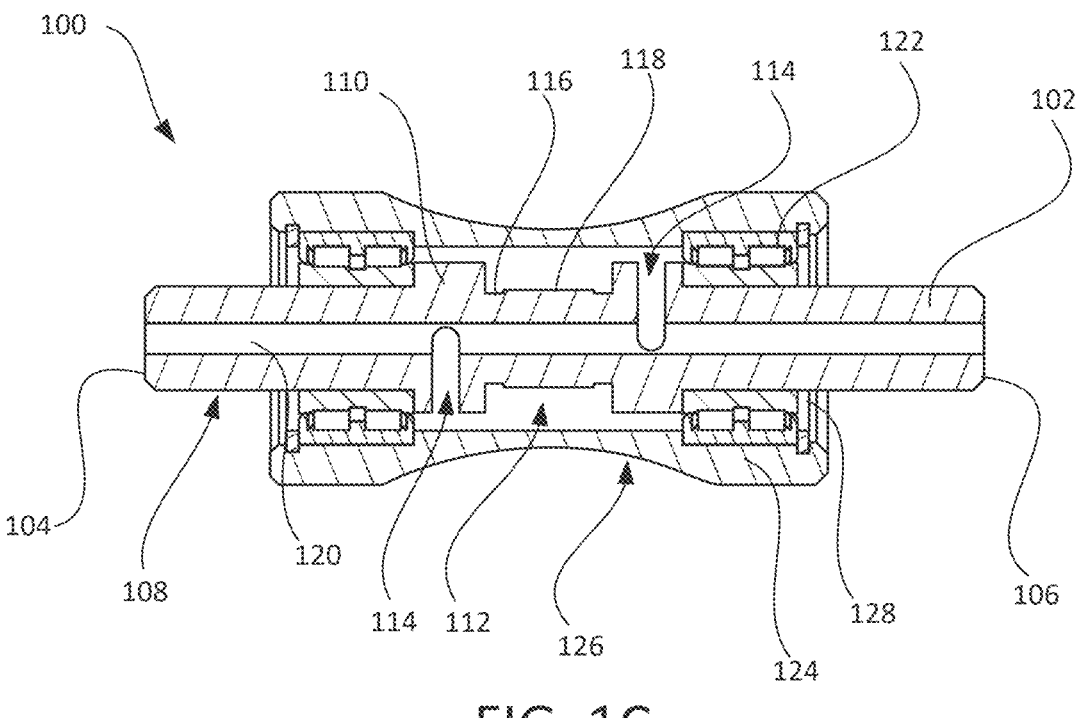
FIG. 1C illustrates a partial cross-sectional side elevation view of the dynamic load safety device of FIG. 1A.
Figure 1D:
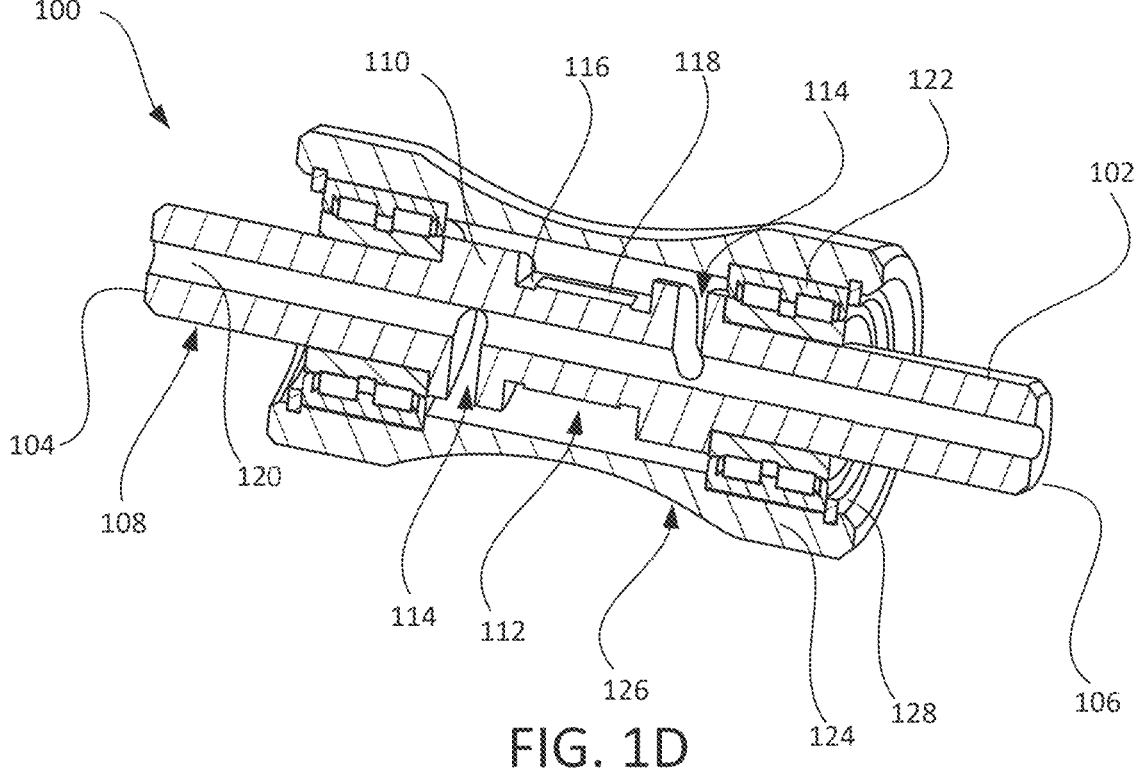
FIG. 1D illustrates a partial cross-sectional isometric view of the dynamic load safety device of FIG. 1A.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the letter.

DETAILED DESCRIPTION OF THE INVENTION

Rotary devices are often used to feed material (such as ropes, belts, webbing, wires, copper windings, etc.) along a processing line and/or to drive rotation of cutting devices (such as saws). Due to the rotating nature, as well as the use of variable cross-section rollers, the loads on the rollers and the material/cutting devices may change over time. If the loads on the rollers and rotated materials become too high, the tension on the material may become too high and may result in damage to the material and/or the processing equipment. This damage may result in downtime and productivity loss. Additionally, damage to the rotating material and/or machinery may create safety hazards for humans interacting with the equipment or that are nearby during the failure.

Conventional systems utilize servo-controlled motors to detect tension within the rotating material, but do not utilize load-sensing members in this servo loop to provide feedback when there is overload in the rolling mechanism. Thus, conventional systems may not provide sufficient monitoring to prevent damage caused by over-loading/tensioning the rotating materials. Additionally, some applications may have tight space restrictions that prevent the use of servo-controlled motors for such purposes.

The present technology addresses these problems by using strain gauges mounted on shafts to directly detect tension on rotating materials mounted about the shaft, which may provide more accurate and quick determinations of whether the tension is approaching and/or exceeding a safety (or other limit). This may enable safety precautions to be performed before any damage has occurred. For example, the machinery speed may be reduced and/or halted to reduce tension, alarms may be signaled, and/or other actions may be taken when the tension approaches, reaches, and/or exceeds a predetermined threshold. Thus, embodiments of the present technology may continually monitor the strain, tension, and/or other forces caused by dynamic loads and enable one or more safety precautions to be triggered automatically to prevent damage and/or safety issues attributed with excess loading of materials and/or equipment.

Although the remaining disclosure will routinely identify specific structures, such as dynamic load safety devices, for which the present structures and methods may be employed, it will be readily understood that the systems and methods are equally applicable to any number of structures and devices that may benefit from the structural capabilities explained. Accordingly, the technology should not be considered to be so limited as for use with any particular structures alone. Moreover, although an exemplary tool system will be described to provide foundation for the present technology, it is to be understood that the present technology can be incorporated with any number of coating chambers and tools that may benefit from some or all of the operations and systems to be described.

FIGS. 1A-1D show different schematic views of a dynamic load safety device 100. The dynamic load safety device 100 may be integrated into any number of pieces of equipment that utilize moving materials and/or components to produce a given object or other result. For example, the dynamic load safety device 100 may be used in place of an existing rolling element of a piece of equipment and/or may be used as an additional rolling element within the equipment. The dynamic load safety device 100 may include a shaft 102 that may be used to mount the dynamic load safety device 100 to a given piece of equipment as will be discussed in more detail below. The shaft 102 may have a first end 104 and a second end 106 that are separated from one another along a length of the shaft 102. The shaft 102 may include a peripheral surface 108 that may extend between the first end 104 and the second end 106. The peripheral surface 108 may be generally cylindrical (e.g., the shaft 108 may have a circular cross-section), although other cross-sectional shapes may be used. Additionally, the cross-sectional shape and/or thickness of the shaft 102 may vary across the length of the shaft 102 such that the peripheral surface 108 is at different distances from a central axis of the shaft 102 at different longitudinal positions. For example, the shaft 102 may include one or more flanges 110 that protrude radially outward (e.g., are thicker) from an adjacent portion of the peripheral surface 108 at different locations along the length of the shaft 102. As illustrated, two flanges 110 are provided at different locations on either side of a central section 112 of the shaft 102.

In some embodiments, one or more of the flanges 110 may include or define a notch or cutout 114 that extends partially through a thickness of the flange 110 and shaft 102. For example, as illustrated each flange 110 defines a respective cutout 114. The cutouts may extend through all or part of the flange 110 and through a portion of the main body of the shaft 102. In some embodiments, one or more of the cutouts 114 may extend through at least half of a thickness of the shaft 102. In other words, one or both cutouts 114 may extend from the peripheral surface 108 of the flange 114 to or beyond the central axis of the shaft 102. In various embodiments, each cutout 114 may extend through between 10% and 75% of a thickness of the shaft 102 (including flange 110), between 15% and 70% of the thickness of the shaft 102, between 20% and 65% of the thickness of the shaft 102, between 25% and 60% of the thickness of the shaft 102, or between 30% and 55% of the thickness of the shaft 102, although other depths are possible in various embodiments.

The cutouts 114 may take various forms. For example, in the illustrated embodiment, each cutout 114 is generally semicircular in shape, although other shapes are possible, especially when the flanges 110 have non-circular cross-sections. The cutouts 114 may extend radially inward toward the central axis of the shaft 102 from a same or different direction. For example, as illustrated, the two cutouts 114 extend radially inward from the peripheral surface 108 in opposite directions, such as with one cutout 114 extending from a top side of the peripheral surface 108 and the other cutout 114 extending from a bottom side of the peripheral surface 108. It will be appreciated that other alignments and orientations of cutouts 114 may be used in various embodiments. The presence of cutouts 114 may enable the shaft 102 to slightly deform or deflect when subject to dynamic loads (such as via a roller), which may better enable strain and other force load measurements to be detected as will be discussed in greater detail below.

As noted above, the shaft 102 may include a central section 112 that is disposed between the flanges 114 in some embodiments. The central section 112 may be centered with respect to the first end 104 and the second end 106 in some embodiments, although in other embodiments the central section 112 may be offset from a center of the shaft 102 (e.g., closer to one of the ends of the shaft 102). In some embodiments, the central section 112 may be generally cylindrical in shape. In other embodiments, other shapes are possible. For example, as illustrated, the central section 118 includes one or more flat or planar surfaces 116 that form a portion of the peripheral surface 108. In the illustrated embodiment, the central section 112 includes four planar surfaces 116 and has a generally rectangular cross-section, however other numbers of planar surfaces 116 and/or other cross-sectional shapes are possible. For example, the central section 112 may include zero planar surfaces, one or more planar surfaces, two or more planar surfaces, three or more planar surfaces, four or more planar surfaces, five or more planar surfaces, six or more planar surfaces, seven or more planar surfaces, eight or more planar surfaces, or more.

The shaft 102 may include and/or otherwise be coupled with one or more strain gauges 118. The strain gauges 118 may be positioned at various locations about the shaft 102. For example, the strain gauges 118 may be coupled with the central section 112, although other locations, such as on lateral (e.g., flat) sides of the flanges 114, are possible in various embodiments. In the illustrated embodiment, each strain gauge 118 is disposed on a respective one of the planar surfaces 116 such that each planar surface 116 includes a different strain gauge 118. In other words, a number of strain gauges 118 may match a number of planar surfaces 116 on the central section 112. In other embodiments, the number of strain gauges 118 may be less than or greater than the number of planar surfaces 116. For example, one or more of the planar surfaces 116 may include no strain gauges 118 and/or one or more of the planar surfaces 116 may include multiple strain gauges 118 in various embodiments. The shaft 102 may include any number of strain gauges 118. For example, the shaft 102 may include one or more strain gauges, two or more strain gauges, three or more strain gauges, four or more strain gauges, five or more strain gauges, six or more strain gauges, eight or more strain gauges, ten or more strain gauges, or more. In the illustrated embodiment, the shaft 102 includes four strain gauges 118 arranged in a rectangular shape about the peripheral surface 108 of the shaft 102. In some embodiments, the strain gauges 118 may be positioned such that the cutouts 114 are positioned on opposing sides of each of the strain gauges 118. Such an arrangement of strain gauges 118 may be particularly effective at detecting changes in dynamic loading of the shaft at different angular locations about the center axis of the shaft 102. While primarily discussed with the strain gauges 118 being disposed on the central section 112, it will be appreciated that one or more strain gauges 118 may be disposed at other locations on the shaft 102, such as on one or more flanges 114 (e.g., on a planar surface of the flange 114 facing one of the ends of the shaft 102) and/or on a portion of the shaft 102 that is longitudinally outward from the central section 112.

The shaft 102 may define one or more channels that extend through all or part of the length of the shaft 102. For example, in the illustrated embodiment the shaft 102 defines a channel 120 that extends along the central axis of the shaft 102. In some embodiments, the channel 120 may extend into one or more of the cutouts 114. The channel 120 may extend through the first end 104 and/or the second end 106. The channel 120 may provide space to accommodate wiring and/or other components of the dynamic load safety device 100. For example, wiring that provides power to the strain gauges 118 and/or transmits strain measurements and/or other signals from the strain gauges 118 may be routed through the channel 120 and coupled with the strain gauges 118. The wiring may extend through one or both ends of the channel 120 to enable the wiring to be coupled with external components of the dynamic load safety device 100 and/or associated equipment.

The dynamic load safety device 100 may include one or more roller bearings 122 that may be mounted on the shaft 102. For example, the dynamic load safety device 100 may include two roller bearings 122 mounted on the shaft, with the two roller bearings 122 being spaced apart from one another along a length of the shaft 102, such as with the strain gauges 118 disposed between the rolling bearings 122. As illustrated, each roller bearing 122 may be positioned against the flanges 110, such as against the faces of each flange 110 that are closest to an end of the shaft 102. While shown with two roller bearings 122, it will be appreciated that any number of roller bearings 122 may be used. For example, the dynamic load safety device 100 may include at least one roller bearing, at least two roller bearings, at least three roller bearings, at least four roller bearings, or more. The roller bearings 122 may be any form of roller bearing, such as (but not limited to) needle roller bearings, cylindrical roller bearings, spherical roller bearings, and/or taper roller bearings.

The dynamic load safety device 100 may include a roller 124 that is mounted on the roller bearings 122. In some embodiments, the roller 124 may be centered relative to each strain gauge 118. The roller 124 may be configured to rotate relative to the shaft 102, with the roller bearings 122 facilitating the rotation of the roller 124. For example, an inner surface of the roller 124 may be seated atop a peripheral surface of the roller bearings 122. An outer or peripheral surface 126 of the roller 124 may face away from the shaft 102 and may provide a support surface about which a material or piece of equipment (e.g., ropes, belts, webbing, wires, copper windings, etc.) may be wound or passed. In some embodiments, the peripheral surface 126 may be generally cylindrical. In other embodiments, the peripheral surface 126 may have other shapes. For example, in some embodiments the peripheral surface 126 may include one or more concave regions. As illustrated, the concave region may be centered with respect to the roller 124, shaft 102, and/or strain gauges 118. The concave region may help maintain the supported material and/or equipment atop the peripheral surface 126 by biasing the supported material and/or equipment toward a center of the concave region and/or center of the roller 124.

The dynamic load safety device 100 may include one or more fasteners and/or other coupling devices that may help maintain the roller 124 in position on the shaft 102. For example, the dynamic load safety device 100 may include a circlip 128 and/or other retaining device that may couple the roller 124 to the shaft 102. In the illustrated embodiment, the inner surface of the roller 124 may define an annular or semi-annular channel or groove that may receive an outer portion of the circlip 128. The groove may be positioned such that an inner surface of the groove is aligned with or proximate an outer surface of a roller bearing 122 and/or a flange 110. Such positioning may enable the circlip 128 to contact the roller bearing 122 and/or flange 110 when inserted within the groove to retain the roller 124 in place on the shaft 102.

The shaft 102, roller bearings 122, and/or roller 124 may be formed from various materials depending on the application. For example, the materials for one or more of the components may be selected based on the maximum load of the equipment, a force profile of the equipment, a maximum rotational speed of the equipment, and/or other factors. For example, in high load equipment (e.g., greater than 500 lbs. of force, the shaft 102 and/or roller 124 may be formed of exceptionally strong materials, such as steel. The roller bearings 122 may similarly be selected from a strong material, such as ceramic and/or steel. In some embodiments, the materials may be selected based on the environment in which the equipment will operate. For example, the materials of the dynamic load safety device 100 may be selected to be clean room compatible. In such embodiments, the components, such as the roller 124 and/or the shaft 102, may be formed from clean room compatible materials, such as certain stainless-steel alloys and/or other materials.

Figure 2:
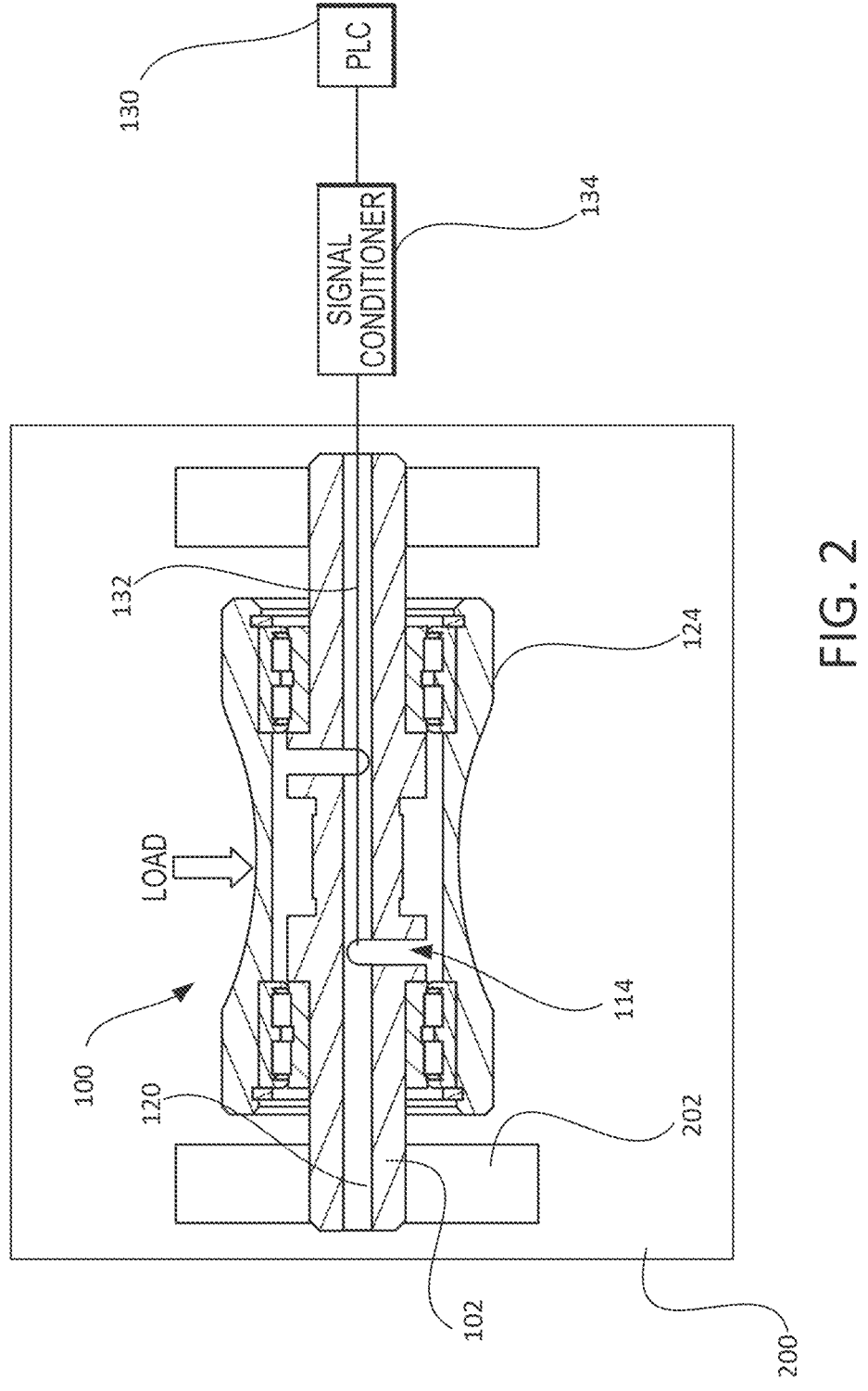
FIG. 2 illustrates a schematic system diagram of the dynamic load safety device of FIG. 1A integrated into a piece of equipment.

FIG. 2 shows a schematic view of the dynamic load safety device 100 integrated into a piece of equipment 200. The equipment may be used for vending operations, looping applications, webbing applications, winding operations, sawing operations, and/or other operations that involve moving long pieces of material (e.g., copper windings, fibers, wires, cables, etc.) and/or equipment components (e.g., belts, pulleys, chains, cords, cord saws, etc.) along a given path. The equipment 200 may be utilized in any other application that may include components and/or move materials that experience dynamic load changes during operation of the equipment. The equipment 200 may include one or more rolling mechanisms that may help move or facilitate movement of the material or components that experience the dynamic loading. The dynamic load safety device 100 may be used in place of one of the rolling mechanisms of the equipment 200 and/or may be added to the equipment as an additional rolling component. For example, the shaft 102 may be mounted in one or more mounting plates 202 and/or other support structures of the equipment. In some embodiments, the shaft 102 may be mounted in the equipment 200 such that the shaft 102 is fixed (e.g., not rotatable) relative to the equipment 200, while the roller 124 remains rotatable relative to the shaft 102. In other embodiments, the shaft 102 may be rotatably mounted in the equipment 200. The shaft 102 may be mounted to the equipment 200 in different orientations. For example, a central axis of each of the cutouts 114 may be oriented in a direction of an expected load in some embodiments. In other embodiments, the central axis of each cutout 114 may be oriented orthogonally or at some other angle relative to the direction of the expected load.

When installed in the equipment 200, the dynamic load safety device 100 may include and/or may be otherwise coupled with a controller 130, such as (but not limited to) a programmable logic controller. For example, the controller 130 may be electrically coupled with each of the strain gauges 118. The controller 130 may receive signals from the strain gauges 118 that the controller 130 may use to determine the load applied to the dynamic load safety device 100. For example, as the roller 124 rotates, the load on the roller 124 may vary. The load may be transferred to the shaft 102 via the roller bearings 122. The cutouts 114 may enable the shaft 102 to slightly deform or deflect. The deformation may create strain within the shaft 102 that may be detected by the strain gauges 118. The controller 130 may use the strain measurements to calculate a total force load being applied to the dynamic load safety device 100. For example, the strain gauges 118 may generate and/or modulate a voltage that is transmitted to the controller 130. A magnitude of the voltage may be compared to one or more threshold values (e.g., positive voltage values or negative voltage values) to determine the magnitude of force applied to the dynamic load safety device 100 and/or to determine whether any safety precautions should be initiated. For example, the strain within the shaft 102 may cause the strain gauges 118 to modulate, generate, and/or otherwise cause a voltage measurement to deviate from a baseline value (which may be 0 V or a positive or negative voltage value). The deviation from the baseline value may be correlated by the controller 130 with a force load on the roller 124/shaft 102. When the voltage/force exceeds a predetermined threshold, one or more safety precautions may be triggered. For example, the controller 130 may slow down the material/equipment 200, stop the material/equipment 200, trigger an audible alarm, trigger a visual alarm, recalibrate the equipment 200, and/or perform another safety action.

The dynamic load safety device 100 may include at least one wire or other electrical line 132. For example, the electrical line 132 may be used to electrically couple the strain gauges 118 with the controller 130. For example, the electrical line 132 may be inserted through the channel 120 to couple with the strain gauges 118 and may exit an end of the channel 120 to couple with the controller 130 (which may be positioned remotely from the shaft 102 and roller 124. The electrical line 132 may be used to pass current to the strain gauges 118 to power the strain gauges 118 and/or to deliver voltage and/or other signals from the strain gauges 118 to the controller 130. In some embodiments, the dynamic load safety device 100 may include a signal conditioner 134 that may be electrically coupled between the strain gauges 118 and the controller 130. The signal conditioner 134 may, for example, may convert the signal from the strain gauges 118 into a value usable by the controller 130 to determine whether the strain on the shaft 102 exceeds a predetermined threshold.

Figure 3:
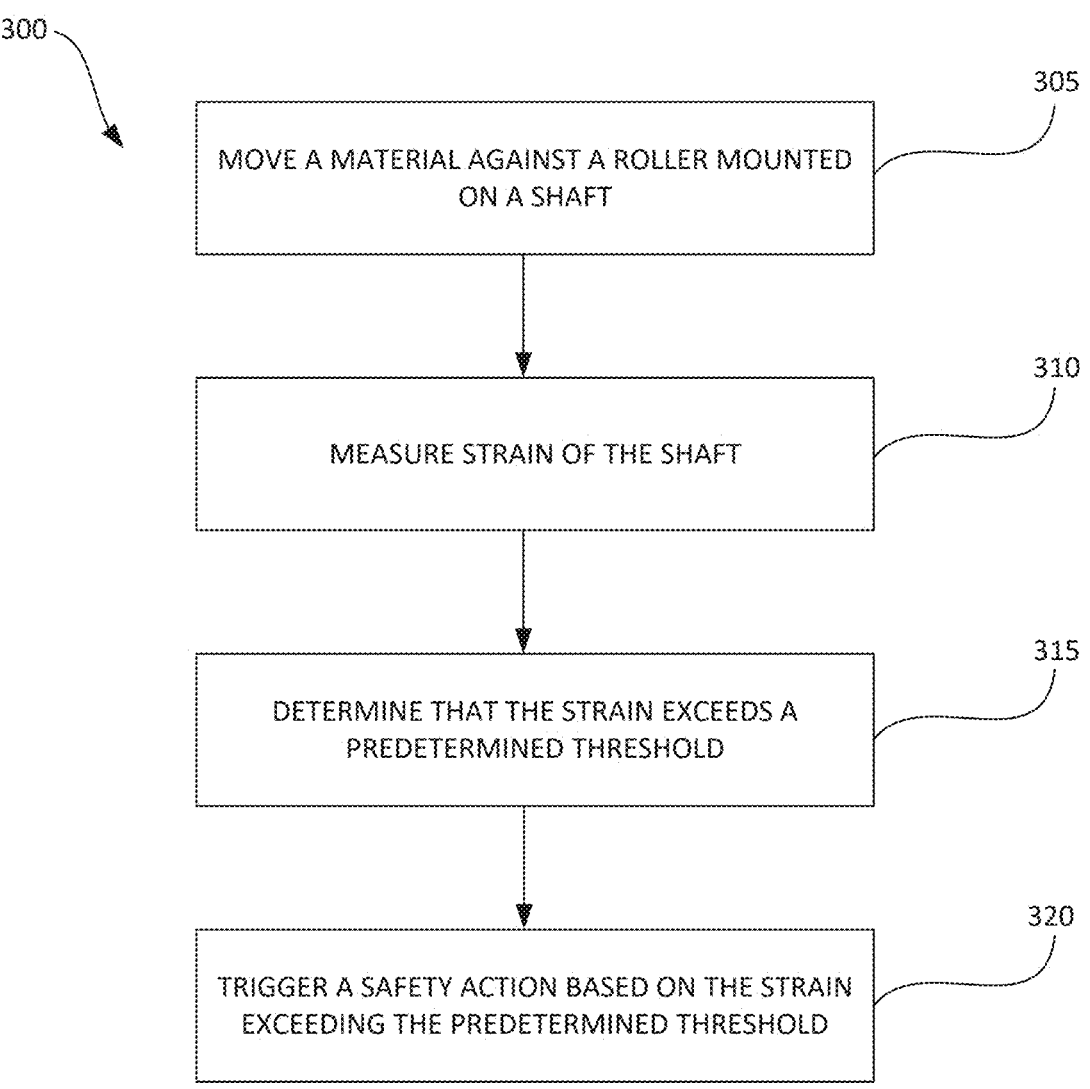
FIG. 3 shows operations of exemplary method of monitoring a dynamic load according to embodiments of the present invention.

FIG. 3 shows operations of an exemplary method 300 of monitoring a dynamic load according to some embodiments of the present technology. The method may be performed in various equipment, including equipment 200 described above, which may include dynamic load safety devices according to embodiments of the present technology. Method 300 may include a number of optional operations, which may or may not be specifically associated with some embodiments of methods according to the present technology.

Method 300 may include optional operations prior to initiation of method 300, or the method may include additional operations. For example, method 300 may include operations performed in different orders than illustrated. In some embodiments, method 300 may include moving a material against a peripheral surface of a roller of a dynamic load safety device at operation 305. Moving the material may include passing the material (which may be a component of the equipment and/or a material being processed) about the peripheral surface of the roller, which may call the roller to rotate about a shaft of the dynamic load safety device. As the load placed upon the roller by the material varies during rotation, the load is transmitted to the shaft via one or more roller bearings. The load may cause the shaft to deform, such as due to the present of cutouts. The deformation of the shaft may generate strain within the shaft.

At operation 310, a strain of the shaft may be measured as the roller rotates about the shaft. At operation 315, a determination may be made that the strain exceeds a predetermined threshold. This may be done, for example, by comparing a voltage value (which may deviate from a baseline value that may be representative of an unloaded shaft) from the strain gauges to be compared to one or more threshold values. The threshold values may represent values that indicate when the load on the roller/shaft is at, exceeding, and/or approaching a maximum safe load for the equipment and/or dynamic load safety device. At operation 320, one or more safety actions may be triggered based on determining that the strain exceeds the predetermined threshold. For example, upon exceeding a threshold, the equipment may slow down the material/equipment, stop the material/equipment, trigger an audible alarm, trigger a visual alarm, recalibrate the equipment, and/or perform another safety action. In some embodiments, multiple thresholds may be used. For example, a lower threshold may trigger an alarm and/or cause the equipment to slow down automatically to prevent the load from further increases. If a higher threshold is reached, the equipment may be shut down automatically to prevent damage to the equipment, material, and/or to prevent other safety hazard.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or ±0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or ±0.1% from the specified value, as such variations are appropriate to in the context of the systems, devices, circuits, methods, and other implementations described herein.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Thus, for example, reference to "a cutout" includes a plurality of such cutouts, and reference to "the flange" includes reference to one or more flanges and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A dynamic load safety device, comprising:
a shaft;
a first roller bearing mounted on the shaft;
a second roller bearing mounted on the shaft, the first roller bearing and the second roller bearing being spaced apart along a length of the shaft;
a roller mounted on the first roller bearing and the second roller bearing; and
at least one strain gauge disposed on the shaft between the first roller bearing and the second roller bearing.

2. The dynamic load safety device of claim 1, wherein:
the at least one strain gauge comprises a plurality of strain gauges.

3. The dynamic load safety device of claim 2, wherein:
each of the plurality of strain gauges is centered with respect to the roller and disposed on a different surface of the shaft.

4. The dynamic load safety device of claim 2, wherein:
the shaft comprises a plurality of flat surfaces; and
each of the plurality of strain gauges is coupled with a respective one of the plurality of flat surfaces.

5. The dynamic load safety device of claim 1, wherein:
the shaft comprises a first cutout that extends radially inward from a peripheral surface of the shaft at a first location along the length of the shaft; and
the shaft comprises a second cutout that extends radially inward from the peripheral surface of the shaft at a second location along the length of the shaft.

6. The dynamic load safety device of claim 5, wherein:
the first cutout is fully disposed beyond a first end of the at least one strain gauge along the length of the shaft and the second cutout is fully disposed beyond a second end of the at least one strain gauge along the length of the shaft; and the first end and the second end are on opposing sides of the at least one strain gauge.

7. The dynamic load safety device of claim 5, wherein:
the first cutout and the second cutout each extend through at least half of a thickness of the shaft.

8. The dynamic load safety device of claim 5, wherein:
the first cutout and the second cutout extend radially inward from the peripheral surface in opposite directions.

9. The dynamic load safety device of claim 1, wherein:
at least a portion of a peripheral surface of the roller is concave.

10. The dynamic load safety device of claim 1, further comprising:
at least one electric line coupled with the at least one strain gauge.

11. The dynamic load safety device of claim 10, wherein:
the at least one electric line extends through a channel formed within the shaft; and
a central axis of the channel extends longitudinally along at least a portion of the length of the shaft.

12. A dynamic load safety device, comprising:
a shaft;
one or more bearings mounted on the shaft;
a roller mounted on the one or more bearings; and
at least one strain gauge disposed on the shaft.

13. The dynamic load safety device of claim 12, further comprising:
a controller that is electrically coupled with the at least one strain gauge.

14. The dynamic load safety device of claim 13, further comprising:
a signal conditioner electrically coupled between the at least one strain gauge and the controller.

15. The dynamic load safety device of claim 12, wherein:
the shaft comprises a first cutout that extends radially inward from a peripheral surface of the shaft at a first location along a length of the shaft; and
the shaft comprises a second cutout that extends radially inward from the peripheral surface of the shaft at a second location along the length of the shaft.

16. The dynamic load safety device of claim 15, wherein:
each of the first cutout and the second cutout comprises a generally U-shape; and
an arc of the generally U-shape forms a greatest depth of a respective one of the first cutout and the second cutout.

17. The dynamic load safety device of claim 12, wherein:
a peripheral surface of the roller comprises a concave region; and
the concave region is centered with respect to the at least one strain gauge.

18. A method of monitoring a dynamic load, comprising:
moving a material against a peripheral surface of a roller of a dynamic load safety device, wherein the roller is mounted on a shaft using at least one roller bearing;
measuring a strain of the shaft as the roller rotates about the shaft;
determining that the strain exceeds a predetermined threshold; and
triggering a safety action based on determining that the strain exceeds the predetermined threshold.

19. The method of monitoring a dynamic load of claim 18, wherein:
the safety action comprises at least one of slowing down the material, stopping the material, triggering an audible alarm, or triggering a visual alarm.

20. The method of monitoring a dynamic load of claim 18, wherein:
the shaft remains stationary relative to the material while roller rotates about the shaft.

* * * * *